United States Patent [19]
Eustache

[11] Patent Number: 5,890,256
[45] Date of Patent: Apr. 6, 1999

[54] SCREEN WIPING APPARATUS FOR A MOTOR VEHICLE, HAVING AN IMPROVED MECHANISM FOR ORIENTATION OF A DRIVE SPINDLE

[75] Inventor: Jean-Pierre Eustache, Antony, France

[73] Assignee: Valeo Systemes D'Essuyage, La Verriere, France

[21] Appl. No.: 938,575

[22] Filed: Sep. 26, 1997

[30] Foreign Application Priority Data

Sep. 30, 1996 [FR] France .................................. 96 11988

[51] Int. Cl.⁶ ................................ B60S 1/06; B60S 1/18; F16H 21/18
[52] U.S. Cl. ........................ 15/250.21; 15/250.3; 74/107; 74/96; 74/47
[58] Field of Search ............................ 15/250.21, 250.23, 15/250.3, 250.19, 250.13, 250.16; 74/47, 43, 105, 96, 107, 42

[56] References Cited

U.S. PATENT DOCUMENTS

| | | | |
|---|---|---|---|
| 2,079,399 | 5/1937 | Drew et al. ........................... | 15/250.23 |
| 2,533,963 | 12/1950 | Sacchini ............................... | 15/250.21 |
| 2,624,904 | 1/1953 | Wiance ................................ | 15/250.23 |
| 2,691,186 | 10/1954 | Oishei et al. ........................ | 15/250.23 |
| 2,827,653 | 3/1958 | Dyer et al. .......................... | 15/250.21 |
| 2,852,799 | 9/1958 | Wallis ................................. | 15/250.21 |
| 2,878,506 | 3/1959 | Krohm ................................ | 15/250.21 |
| 5,186,064 | 2/1993 | Matsumoto et al. ................. | 15/250.3 |

Primary Examiner—Gary K. Graham
Attorney, Agent, or Firm—Morgan & Finnegan, LLP

[57] ABSTRACT

A motor vehicle screen wiper apparatus comprises a screen wiper mounted on the upper end of a drive spindle, the apparatus including means for varying the inclination between the spindle axis and a reference axis which is substantially at right angles to the plane of the glass to be swept. The drive spindle is mounted for pivoting movement about at least one pivot axis, and the apparatus includes a cam mechanism which controls this pivoting movement of the drive spindle, so as to vary the inclination between the drive spindle axis and the reference axis as a function of the rotational position of the drive spindle about its own axis of rotation.

17 Claims, 8 Drawing Sheets

SCREEN WIPING APPARATUS FOR A MOTOR VEHICLE, HAVING AN IMPROVED MECHANISM FOR ORIENTATION OF A DRIVE SPINDLE

FIELD OF THE INVENTION

This invention relates to screen wiping apparatus for wiping a glass surface, such as a windshield, of a motor vehicle, the apparatus including a drive mechanism which includes means for varying the orientation of the drive spindle which actuates the wiper.

More particularly, the invention relates to a screen wiping apparatus for a motor vehicle of the type in which a screen wiper is mounted at the upper end of a drive spindle, which is itself driven in alternating rotational movement about its axis by a wiper motor, the apparatus being further of the type in which a mechanism is provided for varying the inclination of the axis of the drive spindle with respect to a reference axis which is substantially at right angles to the plane of the glass surface to be swept, also referred to herein as the swept surface.

BACKGROUND OF THE INVENTION

In such an apparatus, the screen wiper includes a wiping strip of flexible elastomeric material which it holds against the swept surface, and which it drives in alternating rotational wiping movement in the well known way.

Motor vehicle glass surfaces, and more particularly windshields, are generally curved, so that it is necessary for the screen wiper to include a screen wiper blade having an articulated structure adapted to force the wiping strip to be in contact over its whole length with the swept surface. The articulated structure also enables the contact pressure of the wiping strip against the swept surface to be substantially homogeneous over the whole length of the wiping strip. For this purpose the articulated structure is arranged to be deformable in a plane which is substantially at right angles to the swept surface, and it holds the wiping strip in this plane of deformation by means of claws.

However, as the screen wiper blade travels over the swept surface in its alternating rotational wiping movement, the plane of deformation of its articulated structure does not remain rigorously perpendicular to the plane of the swept surface, because of the curvature of the latter. As a result, the wiping strip is in contact with the swept surface at an angle which varies according to the position of the screen wiper on the glass.

It has become apparent that this inclination of the wiping strip has a very detrimental effect on the quality of wiping given by the screen wiper blade. A particularly unfavourable situation is the case where, with reference to a motor vehicle windshield, the screen wiper is so designed as to wipe over an end portion at the side of the windshield, which is curved backwards so that it terminates substantially parallel to the lateral riser of the vehicle bodywork that supports the side edge of the screen. The angle of inclination of the wiper strip with respect to the glass is then very large, and tends to adversely effect the efficiency of the screen wiper in that zone.

DISCUSSION OF THE INVENTION

With a view to providing a solution to this problem, the invention proposes a screen wiper of the particular type set forth under "Field of the Invention" above, characterised in that the drive spindle is mounted for pivoting movement about at least one pivot axis which is at right angles to the axis of the drive spindle, and in that a cam mechanism is provided which controls the pivoting of the drive spindle so as to cause the inclination of the spindle axis with reference to the reference axis to be varied as a function of the rotational position of the drive spindle about its axis of rotation, i.e. about the spindle axis.

In some embodiments of the invention, the drive spindle is mounted for pivoting movement about two intersecting axes which are perpendicular to each other and perpendicular to the axis of the drive spindle. In other embodiments, the drive spindle is mounted for pivoting movement about a single fixed axis which is perpendicular to the axis of the drive spindle.

In either of the above two cases, in preferred arrangements according to the invention the drive spindle carries a cam follower which is mounted for rotation with respect to the spindle about the axis of the spindle, the cam follower being immobilised against rotation about the axis of the spindle with respect to a bearing body in which the drive spindle is mounted for rotation, and the cam follower is in engagement against a cam (or camming) surface which is rotatable in the bearing body, and the displacements of which are controlled as a function of the rotation of the drive spindle about its axis.

With this arrangement, the cam surface is preferably carried by a disc which is mounted for rotation in the bearing body about the reference axis. Alternatively or in addition, the cam surface preferably has a profile which varies according to the rotational position about the reference axis.

In some embodiments of the invention, the cam follower comprises a transverse bar (or equivalent) which is mounted for rotation at the lower terminal end of the drive spindle and extends at right angles to the axis of the spindle, the transverse bar being guided within the bearing body in a trajectory which is contained within a plane parallel to the reference axis, a free end of the transverse bar being in engagement against the camming surface.

Where the camming surface has a profile which varies according to the rotational position about the reference axis, the drive spindle may include a crank, perpendicular to the spindle axis and having a free end which carries a drive finger, the drive finger being adapted to be received in a radial direction in an opening formed in the cam support disc that carries the cam surface, so that the drive finger drives the cam support disc in rotation about the reference axis, according to the rotational position of the drive spindle about the spindle axis.

According to another preferred feature of the invention, the camming mechanism includes a camming surface which is carried by the bearing body, the profile of the said camming surface varying in a direction which is radial with respect to the reference axis, and the drive spindle carrying a cam follower which engages in at least two points on the camming surface.

In this last mentioned case, the cam follower preferably includes two engagement points which are diametrically opposed to each other with respect to the axis of rotation of the drive spindle. The mechanism then preferably includes two cam follower rollers diametrically opposed to each other with respect to the reference axis.

In some embodiments of the invention, the camming mechanism includes a camming surface which is fixed on the drive spindle, in such a way as to rotate with the latter about its axis, the profile of the camming surface in the radial direction of the drive spindle varies according to the angular (rotational) position of the portion of the camming surface concerned about the axis of the drive spindle, and the camming surface is in engagement against at least two points that are fixed with respect to the bearing body.

Preferably, with this arrangement the camming surface is in engagement against follower rollers, each of which is mounted in the bearing body, for rotation with respect to the bearing body about an axis which is substantially parallel to the reference axis.

In some embodiments of the invention, at least one of the cam follower rollers is mounted for movement in a direction substantially at right angles to the surface of the cam, and this roller, or at least one said roller, is biassed by resilient return means towards the camming surface.

In embodiments where the drive spindle is mounted for pivoting movement about a single fixed pivot axis at right angles to the axis of the drive spindle, the drive spindle may be mounted in the bearing body through an interposed spherical bearing, guide means complementary with the drive shaft in the bearing body being provided, for limiting the pivoting movement of the drive spindle within the bearing body to pivoting movement in one plane. Alternatively, the drive spindle may be mounted in the bearing body through a simple pivot, about the said single fixed axis.

Further features and advantages of the invention will appear more clearly on a reading of the following detailed description of some preferred embodiments of the invention, which is given by way of non-limiting example only and with reference to the accompanying drawings.

DESCRIPTION OF PREFERRED
EMBODIMENTS OF THE INVENTION

Figure 1:
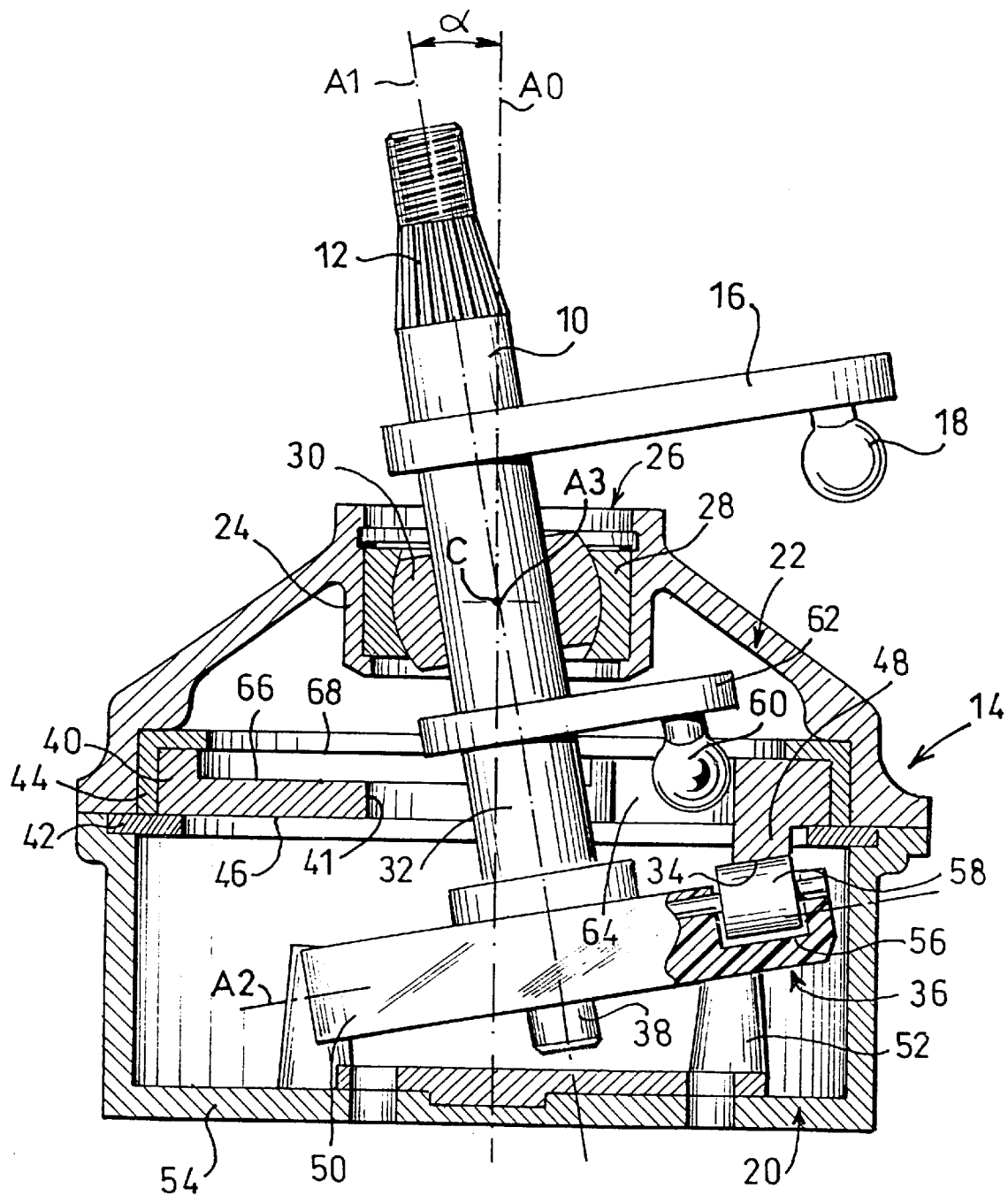
FIG. 1 is a view in axial cross section of a mechanism in a first embodiment of the invention, for causing tilting of a drive spindle to take place as a function of its rotational position.
Figure 2:
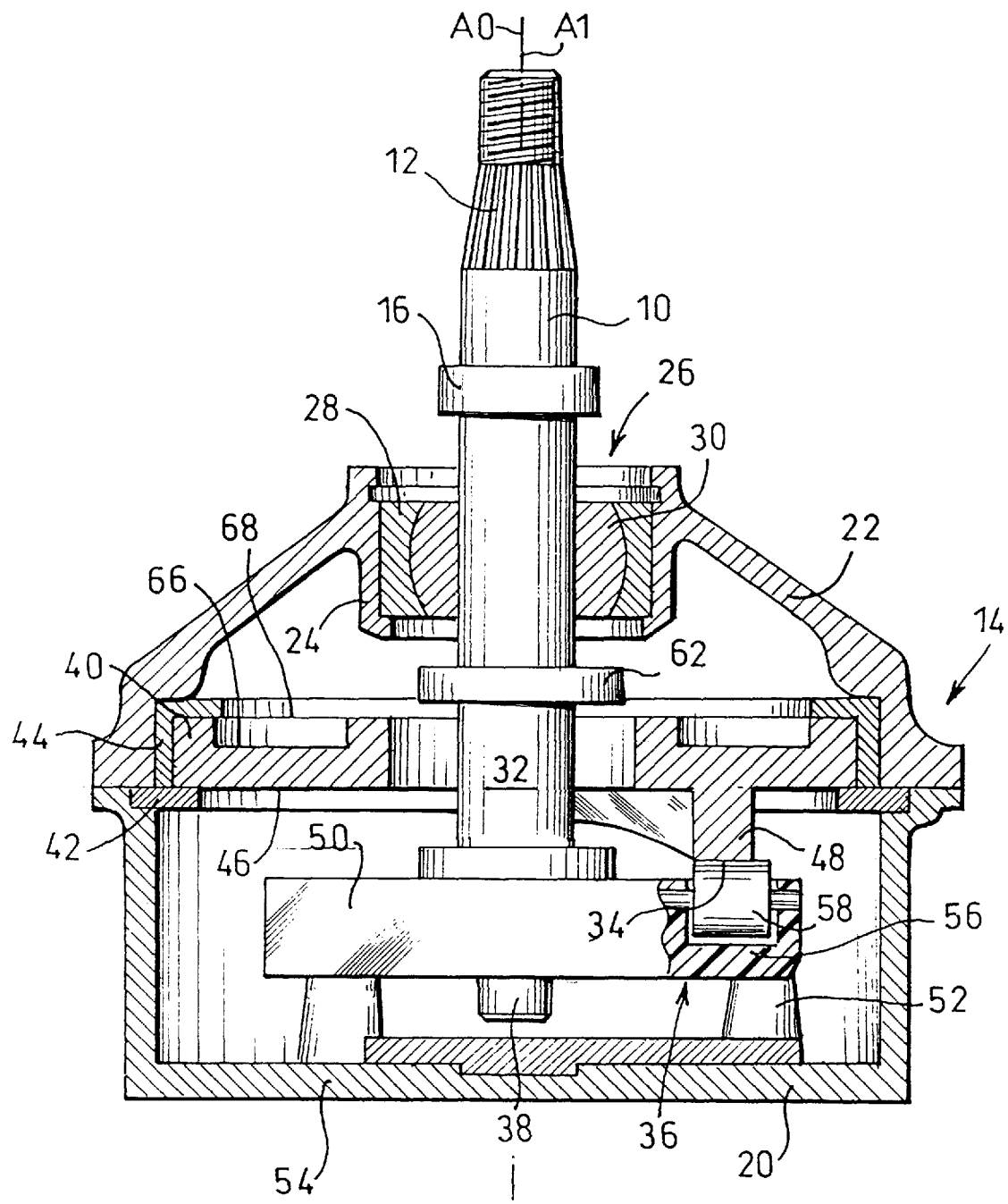
FIG. 2 is a view similar to that of FIG. 1 in which the mechanism is shown in a condition in which the drive spindle occupies a different rotational position about its axis from that seen in FIG. 1.

Reference is first made to FIGS. 1 and 2 showing a first preferred embodiment of the invention.

FIG. 1 shows a drive spindle 10 of a screen wiper, for wiping over a glass surface (not shown) of a motor vehicle. The screen wiper itself, which is not shown, is adapted to be mounted on the upper end portion 12 of the spindle 10, so as to be driven in alternating rotary wiping movement about the axis A1 of the spindle 10. The spindle 10 is guided in a bearing body 14 which is located close to the glass to be swept (referred to in this description as the swept surface). The body 14 is mounted on the inside of a bodywork panel (not shown). It is only the upper end portion 12 of the spindle 10 that extends outside the bodywork panel.

The drive spindle 10 includes a control crank 16 for driving the spindle in rotation about its axis A1. The control crank 16 extends substantially at right angles to the axis A1, and is fixed on the spindle 10 above a lower portion 32 of the spindle, which lies within the bearing body 14. In a manner known per se, the control crank 16 carries a coupling ball 18 at its free end. The coupling ball 18 is connected through a suitable linkage (not shown) to a drive unit in the form of a conventional motorised reduction gear unit, for driving the screen wiper.

In accordance with features of the invention, the bearing body 14 encloses a tilting mechanism which guides the drive spindle 10 in rotation about its axis A1, and which causes the inclination of the 10 axis A1 of the spindle 10 to vary with respect to a reference axis A0. This reference axis A0 is fixed with respect to the bearing body 14 and therefore with respect to the swept surface, as a function of the angular or rotational position of the drive shaft 10 about its axis A1. This angular position is imposed on the drive shaft 10 by the drive unit mentioned above, through the control crank 16.

The bearing body 14 comprises a lower housing 20 and an upper housing 22, which are abutted together along a substantially median plane which lies at right angles to the reference axis A0.

The upper housing 22 is substantially in the form of an inverted cup, and its upper end carries a tubular sleeve portion 24 on the axis A0. The drive spindle 10 passes through the sleeve 24, in which it is mounted by means of a spherical bearing 26. The spherical bearing 26 has an outer ring 28 which is fixed in the sleeve portion 24, and an inner ring 30 which is fixed to the spindle 10, substantially in the middle of the latter considered along its axis A1. In this way, the spherical bearing 26 provides pivoting mounting for the drive spindle 10 with respect to the bearing body 14, about the centre C of the articulation 26, which is the point where the reference axis A0 intersects the axis A1 of the drive spindle 10 itself.

The lower portion 32 of the drive spindle 10 extends below the centre of articulation C, or pivot point, the lower portion 32 being inside the bearing body 14. In accordance with features of the invention, a cam device governs the inclination of the axis A1 of the drive spindle 10 with respect to the reference axis A0, by pivoting of the spindle 10 about the pivot point C which is the centre of articulation of the spherical bearing 26. In this first embodiment of the invention, the cam device includes a moving cam profile, or camming surface 34. This camming surface cooperates with a cam follower 36, which is coupled, in rotation about the spindle axis A1, with the lower terminal end 38 of the drive spindle 10. More precisely, a cam support disc 40 is mounted for rotation about the reference axis A0 within the bearing body 14.

For this purpose, the support disc 40 is gripped axially between two anti-friction rings 42 and 44. The anti-friction ring 42 is carried by the lower housing 20, and the anti-friction ring 44 by the upper housing 22. The lower anti-friction ring 42 is annular in form, and it retains the cam support disc 40 in the axially downward direction. The upper anti-friction ring 44 is in the form of an angle iron in radial cross section, so that it guides the cam support disc 40 both radially and axially in the upward direction. The cam support disc 40 is held between the anti-friction rings 42 and 44 when the lower housing 20 and upper housing 22 are assembled together.

The lower portion 32 of the drive spindle 10 extends through the cam support disc 40 via a circular aperture 41 on the reference axis A0. The aperture 41 is formed through the cam support disc 40, so that the lower terminal end 38 of the spindle 10 lies below the cam support disc 40. The cam profile 34 is formed on a lower face of the cam portion 48 which projects from the lower face 46 of the cam support disc 40, the cam 48 being in the form of a portion of an annulus centred on the axis A0.

The cam follower 36 consists essentially of a transverse member 50, here in the form of a bar, which extends substantially at right angles to the axis A1 of the drive spindle 10, the cam follower being mounted on the lower terminal end 38 of the drive spindle for rotation of its central portion about the latter. The bar 50 is of generally prismatic form in this example, and is guided, in a vertical plane which contains the reference axis A0, by means of four guide pads 52 which extend vertically upwards from a transverse base wall 54 of the lower housing 20.

As a result, the lower terminal end 38 of the drive spindle 10 is only able to be displaced within the vertical plane that contains the reference axis A0, which is defined by the cooperation of the bar 50 with the four guide pads 52. The axis A1 of the drive spindle 10 is therefore displaced in a vertical plane by pivoting movement about a fixed pivot axis A3 which is at right angles to the reference axis A0, and also at right angles to the vertical plane which is defined by the cooperation of the bar 50 with the four guide pads 52. The fixed pivot axis A3 passes through the centre of articulation C of the spherical bearing 26. In this way, variations in the force exerted by the screen wiper on the swept surface are avoided, and the limitations on applied force imposed by wiping requirements, and in particular by the configuration of the swept surface, are respected.

A free end portion 56 of the bar 50 carries a cam follower roller 58, which is mounted for rotation about an axis which is substantially parallel to the general lengthwise direction A2 of the bar 50. The roller 58 engages against the cam profile 34. It may be arranged that the free end portion 56 of the bar 50 is biassed against the cam profile 34 by means of resilient return means (not shown), which may for example be interposed between the bar 50 and the transverse base wall 54 of the lower housing 20.

The vertical position of the free end portion 56 of the bar 50 varies as a function of the height of the cam 48, that is to say as a function of the distance by which the lower surface defining the cam profile 34 is separated from the lower surface 46 of the cam support disc 40. This variation in position of the portion 56 causes the bar 50 and drive shaft 10 to pivot about the axis A3. This therefore varies the angle α by which the axis A1 of the spindle 10 is inclined with respect to the reference axis A0.

In order that the variation in this angle of inclination α of the drive spindle 10 shall be a function of the angular or rotational position of the spindle 10 about its axis A1, it is accordingly necessary that the cam 48 and its support disc 40 should turn at the same time as the spindle 10 rotates. However, the cam support disc 40 is mounted in rotation about the reference axis A0, while the spindle 10 rotates about its own axis A1, which is not necessarily coincident with the reference axis A0. In addition, the rotational coupling of the drive spindle 10 with the cam support disc 40 is provided by means of a coupling finger 60 which extends parallel to the axis A1, downwardly from the free end of a crank 62 which is fixed to the drive spindle 10 above the cam support disc 40, but below the spherical bearing 26. The coupling finger 60 is received in a radial aperture 64 which is formed in the cam support disc 40, and which is such as to enable the finger 60 to be displaced within the aperture 64 in the radial direction, while preventing any displacement of the finger 60 in a tangential direction with respect to the reference axis A0.

Thus, when the drive spindle 10 pivots about the axis A3 as a result of the cooperation of the cam profile 34 with the cam follower 36, the coupling finger 60 is displaced in the radial direction within the aperture 64; however, when the spindle 10 is driven in rotation about its axis A1 by the control crank 16, the coupling crank 62 causes the cam support disc 40 to rotate simultaneously about the reference axis A0 by cooperation of the coupling finger 60 with the aperture 64.

The lower end of the coupling finger 60 is preferably spherical as shown. In addition, the diameter of the circular aperture 41 and the cam support disc is larger than that of the drive spindle 10, so as to enable the spindle 10 to be displaced about the centre C of articulation of the spherical bearing 26 without interfering with the aperture 41.

As can be seen in FIGS. 1 and 2, the cam support disc 40 is formed with a recess 66 in its upper face 68, except around the aperture 64 which extends over the whole depth of the cam support disc 40, and except also on the periphery of the disc 40 which cooperates with the anti-friction rings 42 and 44.

FIG. 2 shows the mechanism of FIG. 1 when the drive spindle 10 has pivoted through about a quarter of a turn about its axis A1 by the control crank 16. FIG. 2 is a view in axial cross section taken on the same plane of cross section as FIG. 1. This plane is defined by the position of the guide pads 52 within the bearing body 14.

In FIG. 2, the coupling finger 60 on the crank 62 has caused simultaneous rotation of the cam support disc 40 and the cam 48 about the reference axis A0, in such a way that it is another portion of the cam 48 that now cooperates with the roller 58 of the bar 50, which has remained in the same vertical plane with respect to the bearing body 14.

As can be seen in FIG. 2, the depth of the cam 48 in the portion of the latter now engaged by the roller 58 is greater than that of the portion engaged by this roller in FIG. 1, so that the cam follower roller 58 has been forced downwards, with the bar 50 and the drive spindle 10 having therefore pivoted about the axis A3 until the spindle 10 has reached a position in which its axis A1 is substantially coincident with the reference axis A0.

The profile 34 of the cam 48 is preferably so designed as to provide the best possible compensation for the variations due to the curvature of the swept surface, in the orientation of the wiping strip of the screen wiper with respect to the swept surface. Thus, the variation in depth of the cam 48 is not necessarily proportional to the rotation of the cam about the reference axis A0.

Figure 3:
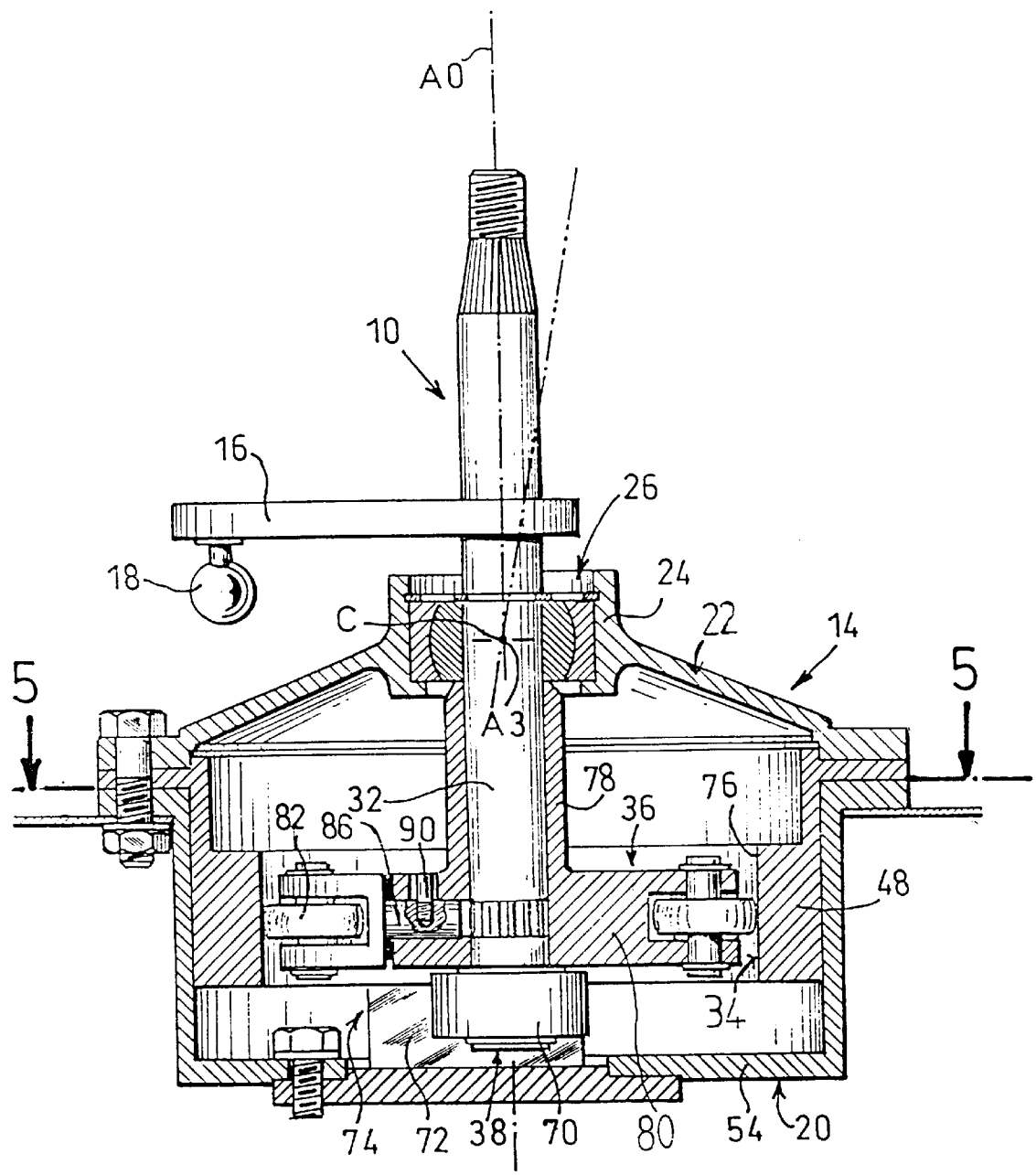
FIG. 3 is a view similar to that in FIG. 1, but shows a second embodiment of the invention.
Figure 4:
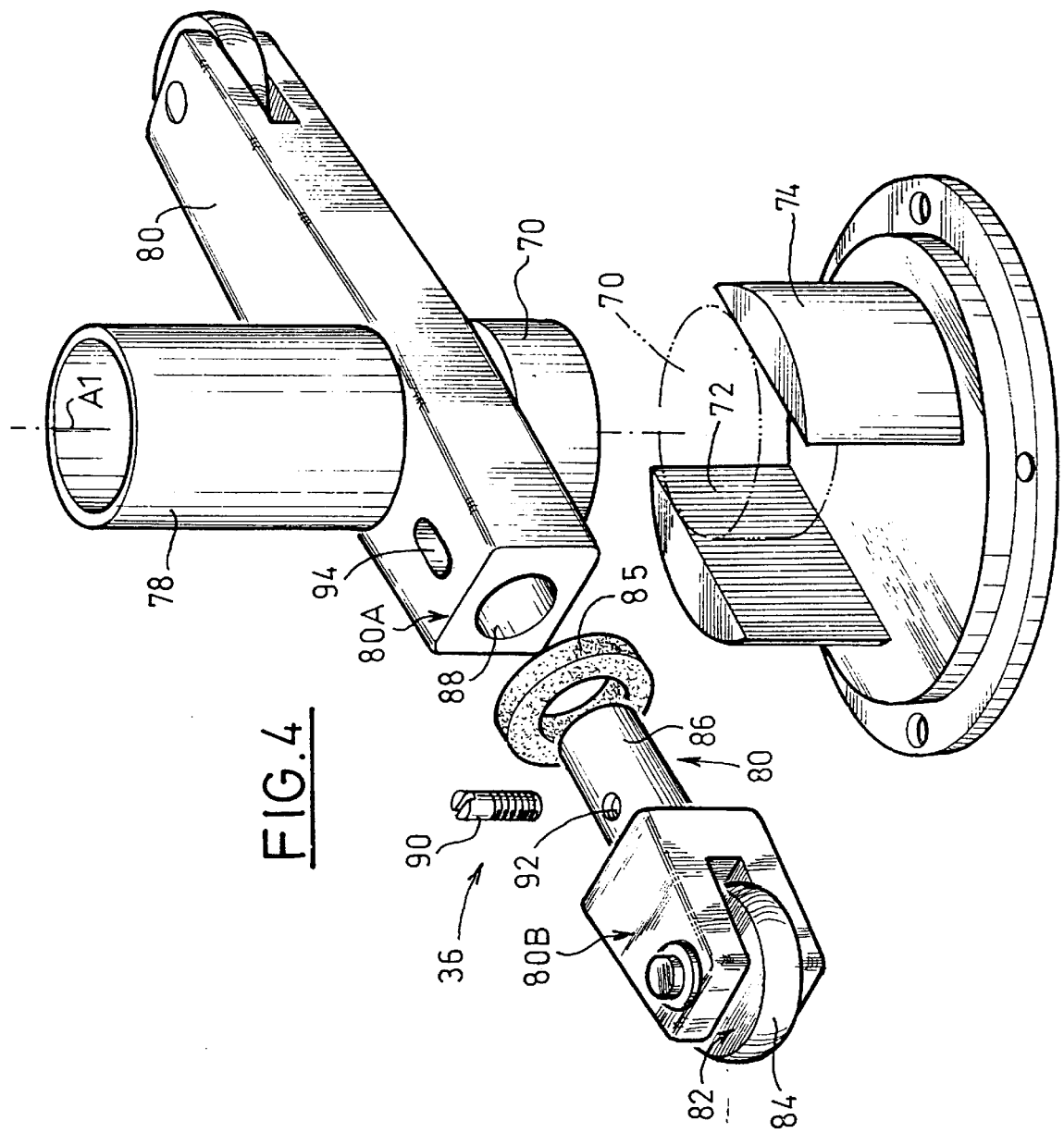
FIG. 4 is an exploded perspective view on an enlarged scale, showing a detail of the mechanism in its second embodiment shown in FIG. 3.
Figure 5:
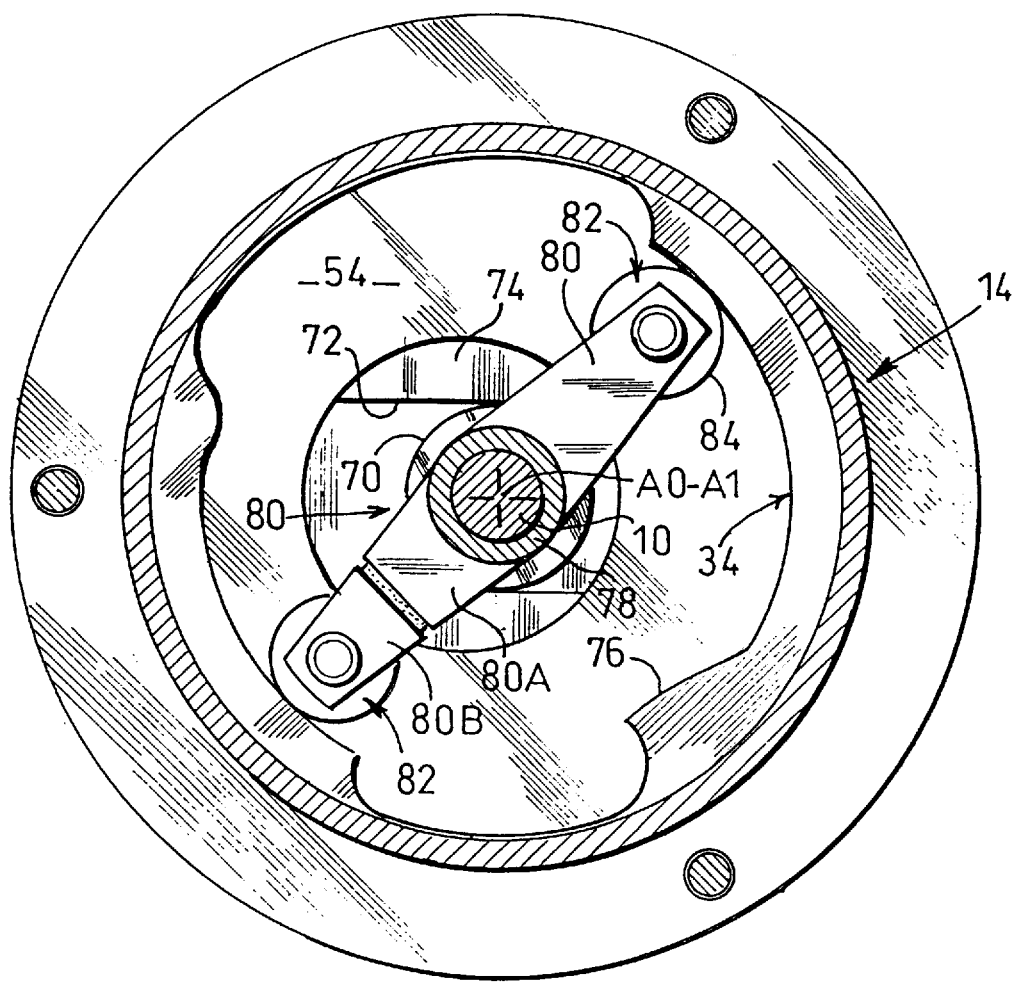
FIG. 5 is a view in cross section taken on the line 5—5 in FIG. 3.

Reference is now made to FIGS. 3 to 5 showing a second preferred embodiment of the invention. In FIGS. 3 to 5, those elements which are similar or identical to those described above and shown in FIGS. 1 and 2 are indicated by the same reference signs.

In this second embodiment, by contrast with the above first embodiment, it can be seen that the cam 48 is fixed within the bearing body 14, and that the cam follower 36 is entirely fixed with respect to the drive spindle 10. In particular, the follower 36 is here fixed against rotation about the spindle 10.

As in the embodiment of FIGS. 1 and 2, the drive spindle 10 is mounted for pivoting movement about the centre of articulation C of the spherical bearing 26, the latter being again mounted within a cylindrical sleeve portion 24 in the upper portion of the upper housing 22 of the bearing body 14. However, the movement of the drive spindle 10 with respect to the bearing body 14 is here limited to planar displacement in a vertical plane which contains the reference axis A0.

For this purpose, a rotatable guide ring 70 is mounted on the lower terminal portion 38 of the spindle, for rotation about the axis A1 of the drive spindle 10. The guide ring 70 is received between two parallel, opposed vertical surfaces 72 of a pair of guide pads 74, which are mounted on the transverse base wall 54 of the lower housing 20 of the bearing body 14. The facing surface 72 of each guide pad 74 lies in a vertical plane, and are spaced apart from each other by a distance which is substantially equal to the diameter of the guide ring 70, so that the surfaces 72 impose on the ring 70 a flat trajectory in a direction A2 about the pivot point C. Thus, as in the embodiment of FIGS. 1 and 2, the drive spindle is limited to pivoting movement with respect to the bearing body 14 about the fixed axis A3, as was explained above.

As can be seen more particularly in FIGS. 3 and 5, the cam 48 is fixed in the lower housing 20, and has a profile 34 which comprises a cylindrical lateral camming surface 76 which is not a surface of revolution. The profile of the cam is determined by a varying spacing of the camming surface 76 with respect to the reference axis A0, in a radial direction with respect to the spindle axis A1 and as a function of the angular position of the portion of the lateral surface 76 considered about the axis A1.

In this embodiment, the cam follower 36, fixed to the drive spindle 10, consists essentially of a tubular sleeve portion 78 which surrounds the lower portion 32 of the drive spindle 10, together with two transverse arms 80 which extend at right angles to the spindle axis A1 at the lower end of the sleeve portion 78. The transverse arms 80 are diametrically opposed to each other with respect to the spindle axis A1, and each arm 80 carries at its free end a follower roller 82 which is arranged to make contact with the lateral camming surface 76 of the cam 48 that defines the cam profile 34.

The actual profile of the camming surface 76 is so defined that any two points diametrically opposed to each other with respect to the axis A1 of the surface 76 are separated by a constant radial distance, though it will be realised that such two points are not necessarily symmetrical with respect to the reference axis A0. The cam follower rollers 82 are located at equal distances from the axis A1 of the drive spindle 10, so that as they follow the lateral surface 76, they cause the lower terminal end 38 of the spindle 10 to be displaced. This displacement can of course only take place within a vertical plane which is defined by the opposed surfaces 72 of the guide pads 74.

The use of a cam 48 with a non-circular profile enables the law by which the inclination of the axis A1 of the drive spindle 10 varies, as a function of the rotational position of the spindle 10 about its axis A1, to be precisely defined. It is therefore possible to adapt this law of variation in order to obtain optimum compensation for the orientation of the wiping strip with respect to the swept surface, according to the curvature of the latter.

In addition, in order to be able to take up operating clearances, and in order to compensate for any geometrical imperfections that may exist in the camming surface 76, at least one of the transverse arms 80 is made in two parts as is best seen in FIG. 4. These two parts consist of a radially inner part 80A and a radially outer part 80B, with a resilient washer 85 being interposed between the two arms 80A and 80B so as to enable the radial length of the arm 80 to adapt itself by a small amount, as appropriate, with respect to the spindle axis A1. To this end, the outer radial part 80B of the arm 80 includes a cylindrical spigot 86 which projects radially inwards and which is received in a complementary bore 88 in the inner radial part 80A of the arm 80. A set screw 90 is screwed into a corresponding radial hole 92 in the spigot 86, with the head of the screw 90 being sunk into the spigot 86 and received in a through aperture 94 formed in the inner radial part 80A of the arm 80, so as to prevent any relative pivoting movement between the two parts 80A and 80B, while enabling the spigot to slide in the bore 88.

As can be seen in FIGS. 3 to 5, the cam follower rollers 82 are rotatable on axes parallel to the axis A1 of the drive spindle 10, and the peripheral working surface 84 of each of these rollers is convex. Thus, when the cam follower rollers 82 follow the cam profile 34, according to their rotational position about the drive spindle axis A1, the latter becomes inclined progressively through the angle α with respect to the reference axis A0.

Figure 6:
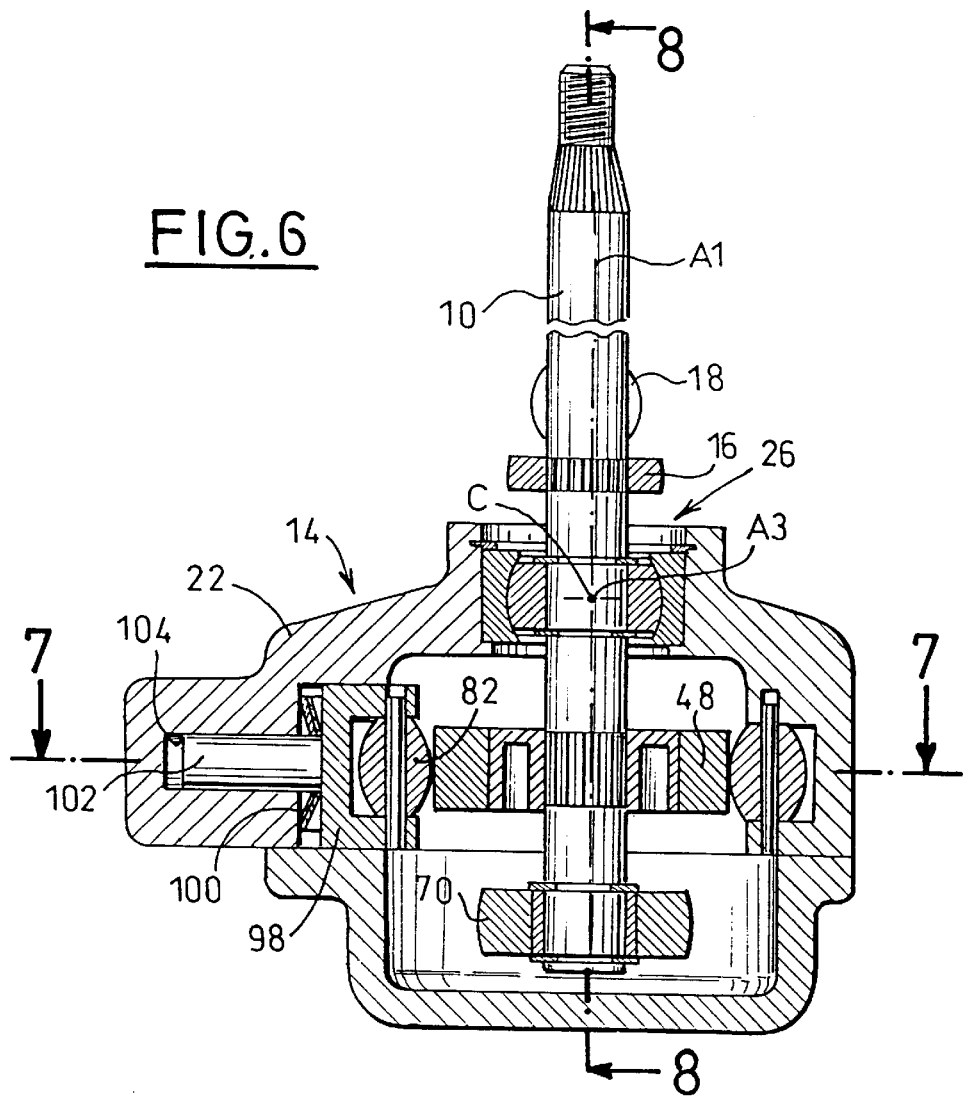
FIG. 6 is a view in axial cross section showing a mechanism in a third embodiment of the invention.
Figure 7:
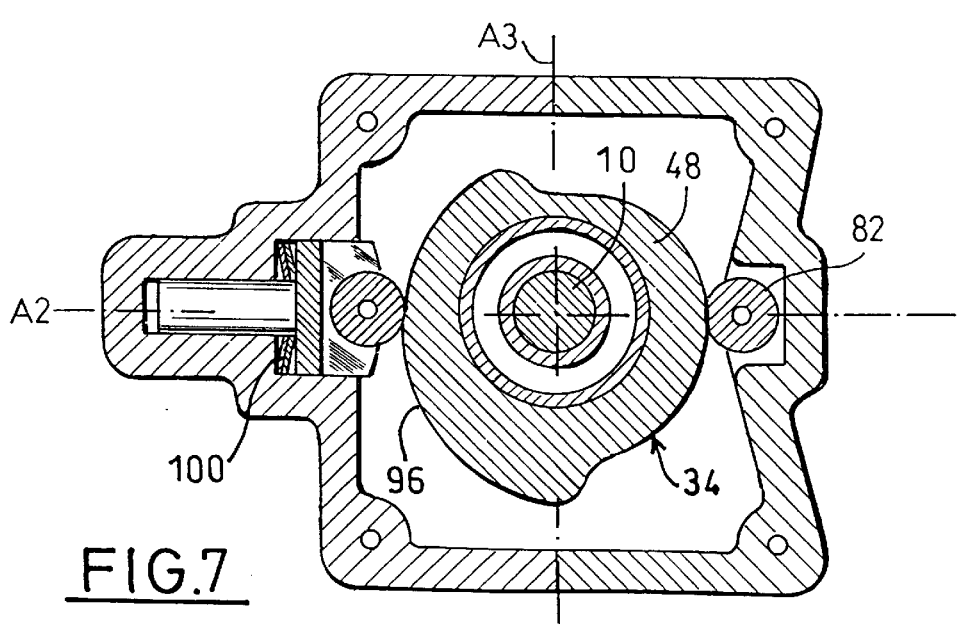
FIG. 7 is a view in cross section taken on the line 7—7 in FIG. 6.
Figure 8:
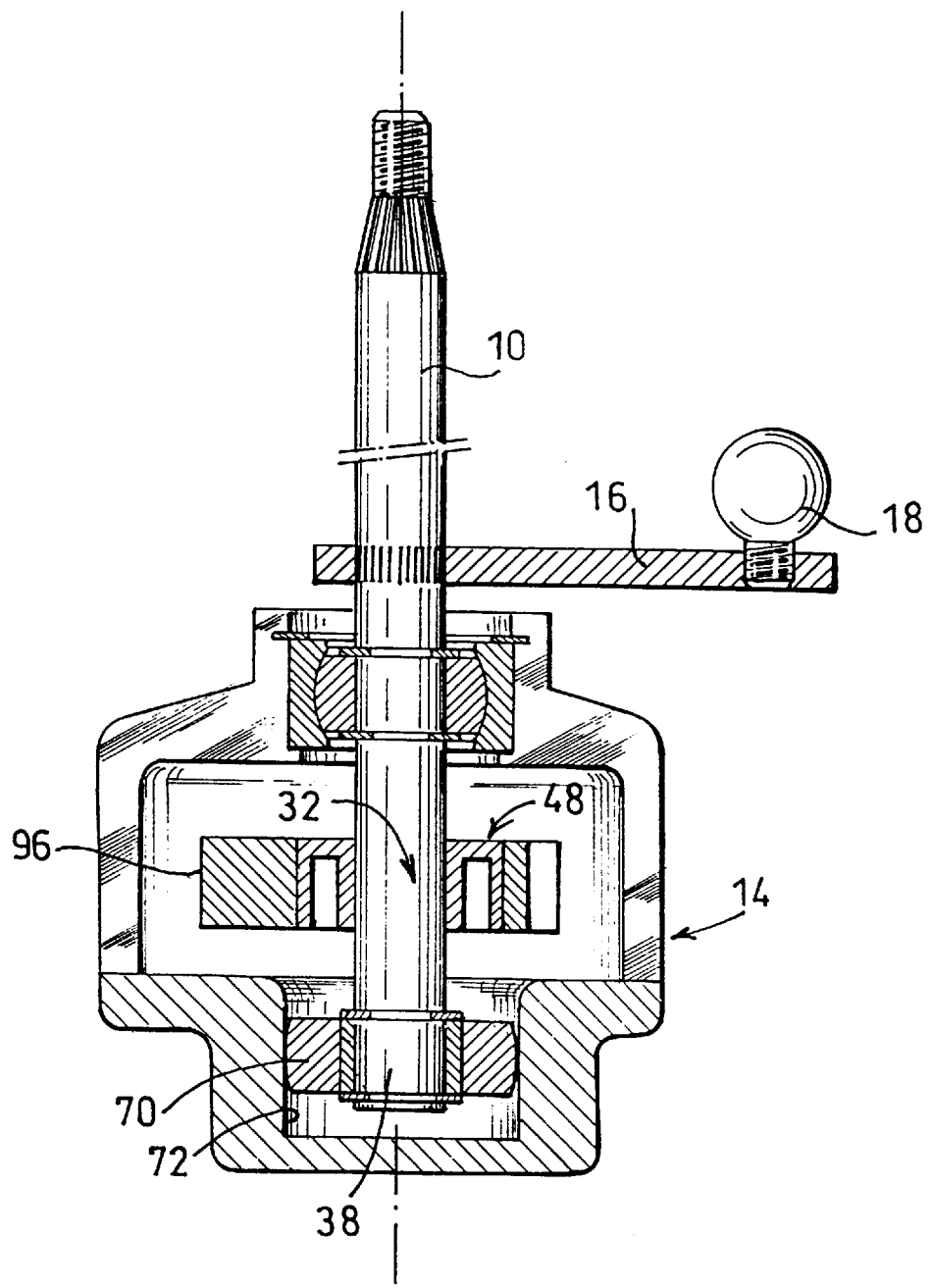
FIG. 8 is a view in cross section taken on the line 8—8 in FIG. 6.

Reference is now to made to FIGS. 6 to 8 showing a third embodiment of the invention, which differs from the second embodiment of FIGS. 3 to 5 in that the cam 48 is here carried by the drive spindle 10, and rotates with the latter about its axis A1, while the cam follower rollers 84 are carried by the bearing body 14.

In this connection, as can clearly be seen in the drawings, the cam 48 is mounted on the lower portion 32 of the drive spindle 10, and it has a cylindrical outer lateral camming surface 96 (which is however not a surface of revolution), defining the cam profile 34. This non-circular cam profile 34 is also defined in such a way that any two points on the lateral camming surface 96 that are diametrically opposed to each other, with respect to the spindle axis A1 are spaced apart from each other by a constant distance, though they are not necessarily symmetrical with respect to the axis A1.

As in the second embodiment described above with reference to FIGS. 3 to 5, the lower terminal end 38 of the drive spindle 10 carries a rotatable guide ring 70. The guide ring 70 is here guided in a transverse direction A2 (see FIG. 8) in such a way as to limit the displacement of the spindle 10 with respect to the bearing body 14 to planar pivoting movement about the fixed axis A3 which passes through the centre of articulation C of the spherical bearing 26.

The external lateral camming surface 96 of the cam 48 is in engagement against two cam follower rollers 82 in the form of olives, which are mounted in the upper housing 22, for rotation about axes which are parallel to the reference axis A0, and which are disposed in the plane in which the drive spindle 10 is displaced. In order to take up operating clearances and to compensate for any geometrical imperfections that may exist in the cam profile 34, one of the follower rollers 82 is mounted in a stirrup member 98 which is movable in the direction A2, and which is biassed towards the cam 48 by resilient return means 100. For this purpose, the stirrup member 98 includes a spigot 102 which is parallel to the direction A2 and which is guided in a corresponding bore 104 formed in the upper housing 22.

Figure 9:
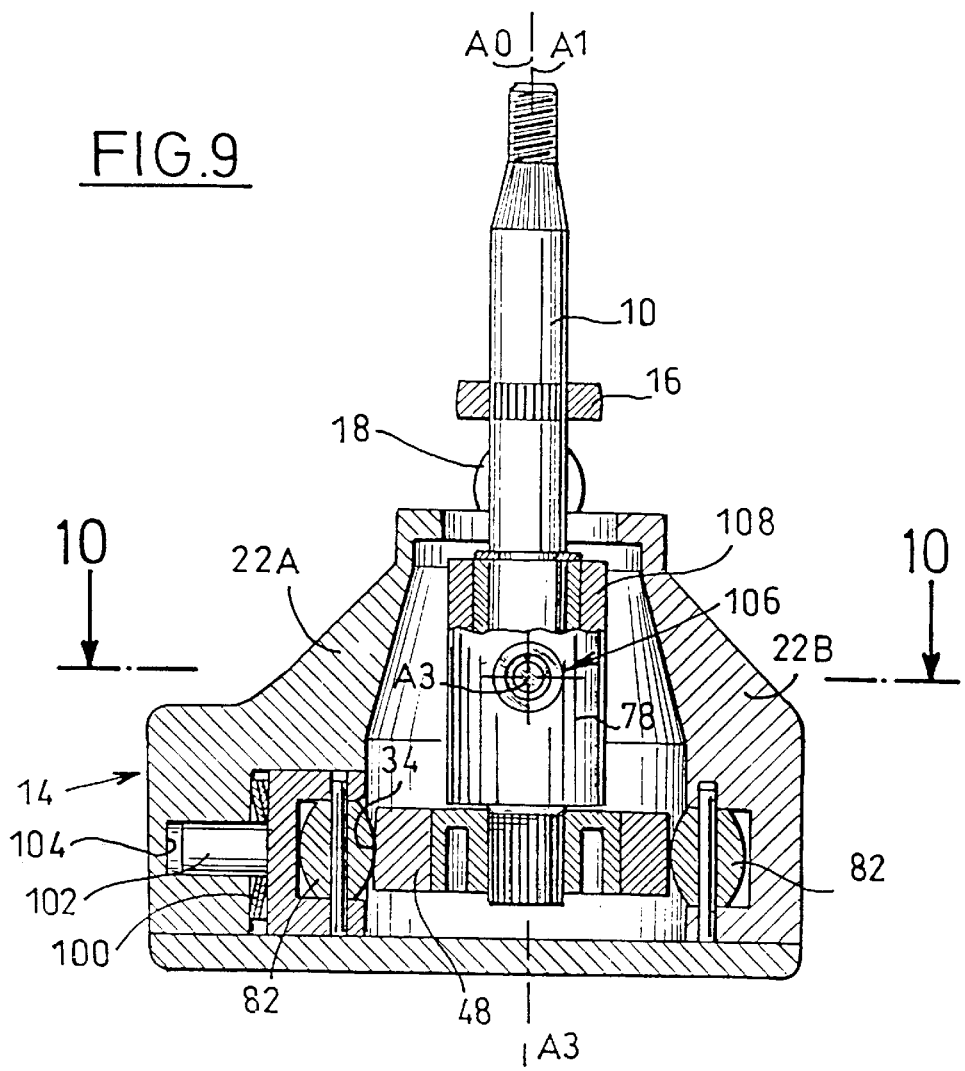
FIG. 9 is a view in axial cross section showing the mechanism in a fourth embodiment of the invention.
Figure 10:
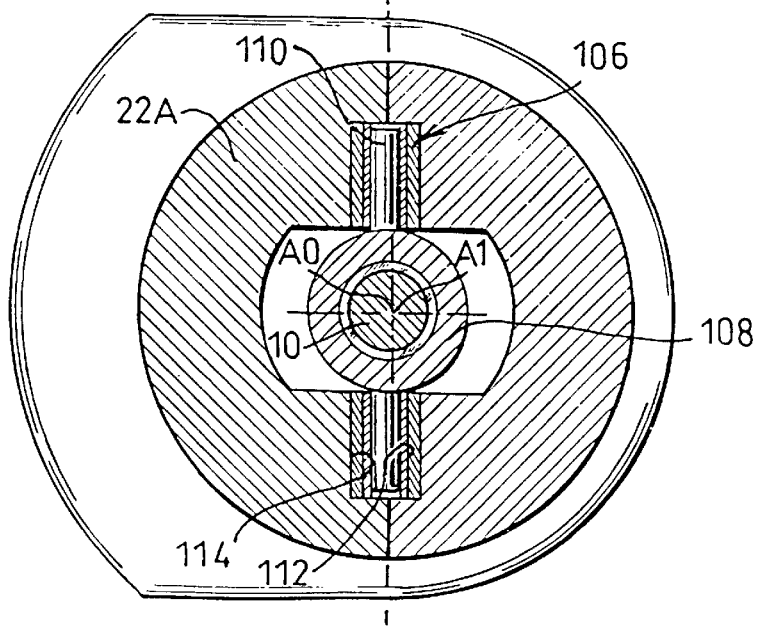
FIG. 10 is a view in cross section taken on the line 10—10 in FIG. 9.

Reference is now made to FIGS. 9 and 10, showing a fourth embodiment of the invention, which differs from the third embodiment shown in FIGS. 6 to 8 in the means for supporting and guiding the drive spindle 10. The version shown in FIGS. 9 and 10 uses the same cam arrangement for governing the inclination of the drive spindle 10 as the embodiment of FIGS. 6 to 8. In this connection, in FIGS. 9 and 10 the drive spindle 10 is not mounted in the bearing body 14 by means of a spherical bearing combined with planar guide means, but is instead mounted through a simple pivot 106 on the axis A3.

For this purpose, the drive spindle 10 is mounted for rotation about its axis A1 within a coaxial sleeve 108, and the sleeve 108 includes two transverse pins 110, which are diametrically opposed to each other on the axis A3, and which are received through anti-friction sleeves 112 in complementary housings 114, which are formed in the bearing body 14 so as to provide the pivoting mounting for the drive spindle 10.

However, it should be noted that such an arrangement does require the upper housing 22 of the bearing body 14 to be made in two parts 22A and 22B, abutting each other in a vertical abutment plane passing through the axis A3.

What is claimed is:

1. Screen wiping apparatus for a motor vehicle having a glazed element, a surface of which is to he swept, the swept surface defining a plane thereof, the apparatus comprising:
   a screen wiper;
   drive means for said screen wiper, the drive means comprising a drive unit;
   a hollow bearing body defining a reference axis substantially at a right angle to the plane of the swept surface;
   a drive spindle having an upper end, the drive spindle rotatably mounted in the bearing body and coupled to the drive unit for driving of the screen wiper by the drive unit in alternate rotational movement, the screen wiper being mounted on the upper end of the drive spindle, the spindle defining a spindle axis;
   the drive means further including a tilting mechanism in the bearing body and coupled to the drive spindle, for tilting the drive spindle in variable inclination of the spindle axis with respect to the said reference axis, wherein the drive means defines at least one pivot axis at right angles to the spindle axis, the drive spindle being mounted in the bearing body for said tilting movement about the pivot axis; and
   wherein the tilting mechanism includes a cam mechanism, the cam mechanism including a cam follower carried by the drive spindle and mounted on the drive spindle, for rotation of the drive spindle about the spindle axis with respect to the cam follower, and means carried by the bearing body for preventing rotation of the cam follower, and means carried by the bearing body for preventing rotation of the cam follower about the spindle axis with respect to the bearing body, the cam mechanism further defining a camming surface mounted for rotation in the bearing body, the cam follower being in engagement against the camming surface, and means carried by the drive spindle for displacing the said camming surface in rotation with respect to the bearing body in response to rotation of the drive spindle about the spindle axis.

2. Apparatus according to claim 1, defining a single fixed pivot axis at right angles to the spindle axis.

3. Apparatus according to claim 1, wherein the cam mechanism includes a cam support disc defining the said camming surface, the cam support disc being mounted in the bearing body for rotation about the reference axis.

4. Apparatus according to claim 3, further including a crank carried by the drive spindle and projecting from the drive spindle at right angles to the spindle axis, the crank having a free end, and a drive finger carried on said free end of the crank, the cam support disc having a radial aperture receiving the drive finger, for displacement of the cam support disc by the drive finger in rotation about the reference axis during rotation of the drive spindle about the spindle axis.

5. Apparatus according to claim 1, wherein the camming surface has a profile which varies according to the rotational position about the reference axis.

6. Apparatus according to claim 1, wherein the cam follower comprises a transverse bar, the drive spindle having a lower terminal end, the transverse bar being mounted for rotation on the lower terminal end of the drive spindle and extending at right angles to the spindle axis, the transverse bar having a free end and follower means at said free end engaging the camming surface, the bearing body having guide means for guiding the said transverse bar in a continuous trajectory in a plane parallel to the reference axis.

7. Apparatus according to claim 1, further including a spherical bearing coupled to the drive spindle, and a guide means complementary to the spherical bearing and carried by the bearing body for guiding the tilting displacement of the drive spindle in the bearing body and for limiting the pivoting movement of the drive spindle in the bearing body to displacement in a single plane.

8. Apparatus according to claim 4, further including a simple pivot coupled to the drive spindle on the pivot axis for mounting the drive spindle in the bearing body.

9. Screen wiping apparatus for a motor vehicle having a glazed element, a surface of which is to be swept, the swept surface defining a plane thereof, the apparatus comprising:
   a screen wiper;
   drive means for said screen wiper, the drive means comprising a drive unit;
   a hollow bearing body defining a reference axis substantially at a right angle to the plane of the swept surface;
   a drive spindle having an upper end, the drive spindle rotatably mounted in the bearing body and coupled to the motorized drive unit for driving of the screen wiper by the drive unit in alternate rotational movement, the screen wiper being mounted on the upper end of the drive spindle, the spindle defining a spindle axis;
   the drive means further including a tilting mechanism in the bearing body and coupled to the drive spindle, for tilting the drive spindle in variable inclination of the spindle axis with respect to the said reference axis, wherein the drive means defines at least one pivot axis at right angles to the spindle axis, the drive spindle being mounted in the bearing body for said tilting movement about the pivot axis; and
   wherein the tilting mechanism includes a cam mechanism, the cam mechanism including a camming surface, the bearing body carrying the said camming surface whereby the camming surface is fixed with respect to the bearing body, the camming surface having a varying profile in a radial direction with respect to the reference axis, the cam mechanism further including a cam follower carried by the drive spindle and engaging on the said camming surface in at least two engagement points.

10. Apparatus according to claim 9, wherein the cam follower defines two said engagement points diametrically opposed to each other with respect to the spindle axis.

11. Apparatus according to claim 10, wherein the cam mechanism includes two follower rollers diametrically opposed to each other with respect to the reference axis, the said rollers defining the said engagement points.

12. Apparatus according to claim 9, further including a spherical bearing coupled to the drive spindle, and a guide means complementary to the spherical bearing and carried by the bearing body for guiding the tilting displacement of the drive spindle in the bearing body and for limiting the pivoting movement of the drive spindle in the bearing body to displacement in a single plane.

13. Screen wiping apparatus for a motor vehicle having a glazed element, a surface of which is to be swept, the swept surface defining a plane thereof, the apparatus comprising:

a screen wiper;

drive means for said screen wiper, the drive means comprising a drive unit;

a hollow bearing body defining a reference axis substantially at a right angle to the plane of the swept surface;

a drive spindle having an upper end, the drive spindle rotatably mounted in the bearing body and coupled to the motorized drive unit for driving of the screen wiper by the drive unit in alternate rotational movement, the screen wiper being mounted on the upper end of the drive spindle, the spindle defining a spindle axis;

the drive means further including a tilting mechanism in the bearing body and coupled to the drive spindle, for tilting the drive spindle in variable inclination of the spindle axis with respect to the said reference axis, wherein the drive means defines at least one pivot axis at right angles to the spindle axis, the drive spindle being mounted in the bearing body for said tilting movement about the pivot axis; and wherein the tilting mechanism includes a cam mechanism, the cam mechanism including a camming surface fixed on the drive spindle whereby to rotate with the drive spindle about the spindle axis, the profile of the camming surface in the radial direction of the drive spindle being variable as the angular position of the portion concerned of the camming surface about the spindle axis is variable, the bearing body carrying means defines at least two fixed engagement points, and the camming surface being in engagement against the said at least two fixed engagement points.

14. Apparatus according to claim 13, further including follower rollers defining said engagement points, the bearing body including means mounting each said follower roller for rotation with respect to the bearing body about an axis of the roller substantially parallel to the reference axis, the follower rollers being in engagement with the camming surface.

15. Apparatus according to claim 13, farther including a spherical beating coupled to the drive spindle, and a guide means complementary to the spherical bearing and carried by the bearing body for guiding the tilting displacement of the drive spindle in the bearing body and for limiting the pivoting movement of the drive spindle in the bearing body to displacement in a single plane.

16. Screen wiping apparatus for a motor vehicle having a glazed element, a surface of which is to be swept, the swept surface defining a plane thereof, the apparatus comprising:

a screen wiper;

drive means for said screen wiper, the drive means comprising a drive unit;

a hollow bearing body defining a reference axis substantially at a right angle to the plane of the swept surface;

a drive spindle having an upper end, the drive spindle rotatably mounted in the bearing body and coupled to the motorized drive unit for driving of the screen wiper by the drive unit in alternate rotational movement, the screen wiper being mounted on the upper end of the drive spindle, the spindle defining a spindle axis;

the drive means further including a tilting mechanism in the bearing body and coupled to the drive spindle, for tilting the drive spindle in variable inclination of the spindle axis with respect to the said reference axis, wherein the drive means defines at least one pivot axis at right angles to the spindle axis, the drive spindle being mounted in the bearing body for said tilting movement about the pivot axis; and wherein the tilting mechanism includes a cam mechanism, the cam mechanism including a cam having a camming surface and cam follower including at least two cam follower rollers, one of said cam and cam follower being carried by the drive spindle, the other of said follower and cam being carried by the bearing body, wherein the cam follower includes means mounting at least one said follower roller for limited displacement of that roller in a direction substantially at right angles to the camming surface, and further including resilient return means associated with said displaceable roller for biassing the latter towards the camming surface.

17. Apparatus according to claim 1, further including a spherical bearing coupled to the drive spindle, and a guide means complementary to the spherical bearing and carried by the bearing body for guiding the tilting displacement of the drive spindle in the bearing body and for limiting the pivoting movement of the drive spindle in the bearing body to displacement in a single plane.

* * * * *